Z. TOMS & L. W. McMULLAN.
Improvement in Cultivators.
No. 126,165.  Patented April 30, 1872.
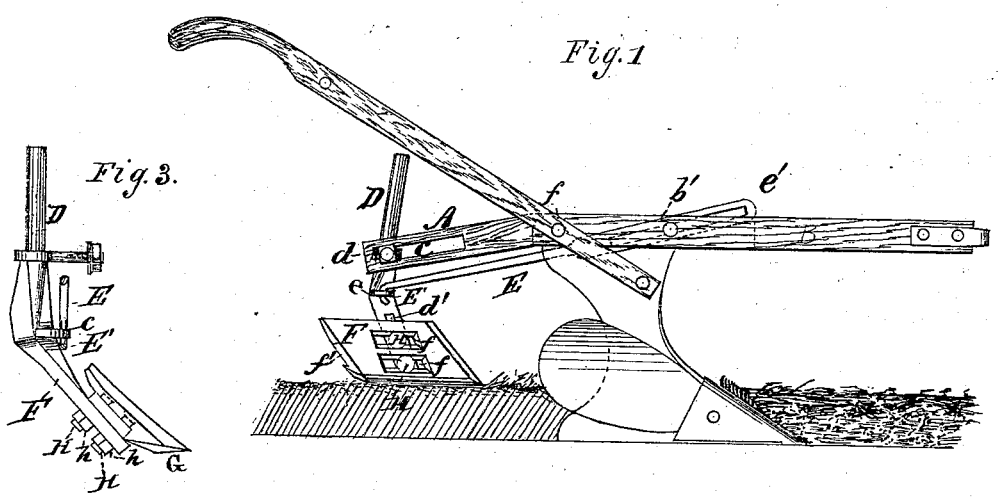
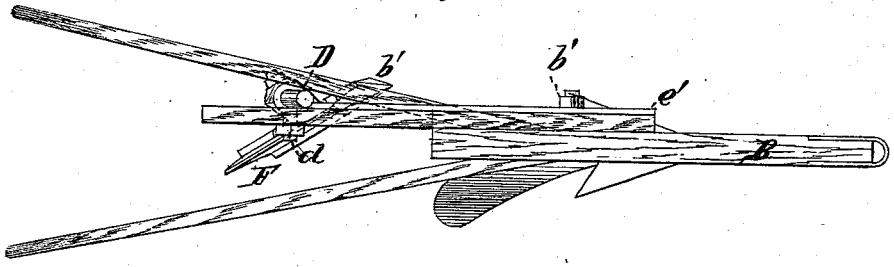

UNITED STATES PATENT OFFICE.

ZACHARIAH TOMS AND LUCULLUS W. McMULLAN, OF HERTFORD, N. C.

IMPROVEMENT IN CULTIVATORS.

Specification forming part of Letters Patent No. 126,165, dated April 30, 1872.

*To all whom it may concern:*

Be it known that we, ZACHARIAH TOMS and LUCULLUS W. MCMULLAN, both of Hertford, in the county of Perquimans and State of North Carolina, have invented a new and Improved Scraper for Plows, of which the following is a specification:

It is the object of our invention to securely attach a scraper to the ordinary plow-beam in such a manner that it may quickly be adjusted to suit the work to be done and firmly held in position, while capable of being adjusted and held out of operation when it is desired to use the plow alone. Our improvements will clearly be designated by the claim.

In the drawing, Figure 1 is a side elevation; Fig. 2, a section through the scraper at the line $y\,y$.

A bar, A, is secured to the plow-beam B by two or more screw-bolts and nuts, $b\,b'$. This bar is slotted at or near its rear end, as shown at C. The round end of a shank, D, carrying the scraper, is secured to the bar A by an eye-bolt, $d$, which passes through the slot C, and is provided with a screw-thread and nut on its end. By loosening and tightening the nut the shank may be adjusted and held as desired. One or more pinch-screws may be used to aid in holding the shank firmly in the eye-bolt $d$. The shank is bent, as shown in the drawing, and is slotted at $d'$ near its lower end. A brace-rod, E, has a hook, E', at its end, which fits in a socket or eye, $e$, in the shank, so as to admit of the turning of the shank. The opposite end $e'$ of this brace-rod is slotted or notched to embrace a bolt having a thread cut upon it, and provided with a clamp-nut to secure the brace-rod in position. In this instance the forward bolt $b'$, for securing the bar A to the beam, serves also to hold the brace-rod in place. The scraper F is formed with two parallel slots, $f\,f$. We prefer to strengthen the scraper around the slots, where there is greatest strain, by an increased thickness of metal, as shown at $f'$, as by this means we are enabled to make the remaining portion of the body of the scraper of very thin metal. The lower edge of the scraper (which in this instance is made thicker than the main portion of the scraper to afford a firm bearing to the steel edge) is chamfered off, and has secured to it by screws, so as to be easily removed, a steel cutter or edge, G, corresponding on one side with the chamfered edge of the scraper, but beveled on its opposite side so as to make both edges cutting-edges, thus providing a reversible edge of steel for the scraper. The scraper is secured to the shank by headed screw-bolts H H, which pass through the slots $f\,f$ in the scraper and the slot $d'$ in the shank, and are provided with nuts $h\,h$, bearing against the back of the shank, to hold the scraper firmly when properly adjusted.

It will be seen from the foregoing description that the scraper may be adjusted vertically and horizontally, and that it may be rocked, to elevate or depress the points, by means of the slots $f\,f$ and $d'$ and the bolts and nuts.

By means of the shank D, eyebolt $d$, slot C, and slotted brace-rod E the scraper may be raised and lowered, moved backward and forward, turned to any desired angle to the beam, its point elevated or depressed, and, when desired, the scraper may be turned with its bent shank to one side of the plow, where it may be elevated to be out of the way.

Our improvements, it will be observed, render the scraper capable of being set near to or away from the heel of the plow, which is of great importance, as in some soils and for some purposes the scraper works to best advantage near the heel of the plow; again it is the reverse of this. This adjustment is also of importance in attaching the scraper to different plows, as the nearer perpendicular the plow-handles are the closer the scraper should be to the plow-heel to be out of the way.

Having described our invention, what we claim as new, and desire to secure by Letters Patent, is—

1. The combination of the bar A and turning shank D and the scraper, substantially as set forth.

2. The combination of the scraper, the adjustable shank, and the adjustable brace-bar, substantially as set forth.

3. The combination of the slotted bar A, the eyebolt $d$, the turning shank D, the adjustable brace-rod, and the scraper, these parts being constructed to operate substantially as set forth.

To the above we have signed our names this 27th day of January, 1872.

ZACHARIAH TOMS.
  LUCULLUS W. McMULLAN.

Witnesses:
 F. BARROW,
 D. P. DAUGHTRY.